(12) United States Patent
Takinami et al.

(10) Patent No.: US 7,941,241 B2
(45) Date of Patent: May 10, 2011

(54) OPTICAL FABRICATION METHOD

(75) Inventors: Norio Takinami, Fukui (JP); Toshio Maeda, Fukui (JP)

(73) Assignee: Matsuura Machinery Corporation, Fukui-shi, Fukui (JP)

( * ) Notice: Subject to any disclaimer, the term of this patent is extended or adjusted under 35 U.S.C. 154(b) by 440 days.

(21) Appl. No.: 11/751,847

(22) Filed: May 22, 2007

(65) Prior Publication Data
US 2008/0099936 A1 May 1, 2008

(30) Foreign Application Priority Data
Oct. 30, 2006 (JP) ................................. 2006-293980

(51) Int. Cl.
*G06F 19/00* (2011.01)
*A61F 2/28* (2006.01)

(52) U.S. Cl. ..................... 700/212; 700/182; 623/16.11; 623/901

(58) Field of Classification Search ............... 700/95, 700/97, 98, 117, 182, 212; 623/16.11, 901; 434/267, 274; 264/1.36
See application file for complete search history.

(56) References Cited

U.S. PATENT DOCUMENTS

| | | | |
|---|---|---|---|
| 6,657,155 B2 * | 12/2003 | Abe et al. .................... | 219/121.6 |
| 6,811,744 B2 * | 11/2004 | Keicher et al. .................... | 419/5 |
| 6,932,610 B2 * | 8/2005 | Ono et al. .................... | 434/274 |
| 6,940,037 B1 * | 9/2005 | Kovacevic et al. ........ | 219/121.64 |
| 6,995,334 B1 * | 2/2006 | Kovacevic et al. ........ | 219/121.63 |
| 7,020,539 B1 * | 3/2006 | Kovacevic et al. ............ | 700/166 |
| 7,255,830 B2 * | 8/2007 | Abe et al. .................... | 419/58 |
| 2002/0129485 A1 * | 9/2002 | Mok et al. .................... | 29/527.2 |
| 2002/0145213 A1 * | 10/2002 | Liu et al. .................... | 264/40.1 |
| 2002/0149137 A1 * | 10/2002 | Jang et al. .................... | 264/494 |
| 2003/0116542 A1 * | 6/2003 | McGregor et al. ........ | 219/121.64 |
| 2004/0128016 A1 * | 7/2004 | Stewart .................... | 700/159 |
| 2004/0228754 A1 * | 11/2004 | Abe et al. .................... | 419/6 |
| 2005/0133527 A1 * | 6/2005 | Dullea et al. .................... | 222/1 |
| 2005/0173380 A1 * | 8/2005 | Carbone .................... | 219/121.31 |
| 2005/0261795 A1 * | 11/2005 | Ghosh et al. .................... | 700/118 |
| 2006/0165546 A1 * | 7/2006 | Yamada et al. .................... | 419/6 |

FOREIGN PATENT DOCUMENTS

| | | |
|---|---|---|
| JP | 8-502703 H | 7/1995 |
| JP | 3446733 | 7/1997 |
| JP | 2003-502500 A | 12/2000 |

\* cited by examiner

*Primary Examiner* — Charles R Kasenge
(74) *Attorney, Agent, or Firm* — Richard M. Goldberg

(57) ABSTRACT

An optical fabrication method which is capable of adjusting a hardness and a density needed for each optical fabrication area in fabricating a three-dimensional fabricated article through sintering with a light beam, and is excellent in a working efficiency performs the steps of forming a powder layer of a predetermined thickness and then sintering the powder layer with a light beam, a predetermined number of times, cutting a periphery of the powder layers, and changing a degree of sintering by changing an amount of irradiation per unit area of a light-beam sintered surface according to a shortest distance from a peripheral surface of each powder layer.

8 Claims, 2 Drawing Sheets

FIG. 1A
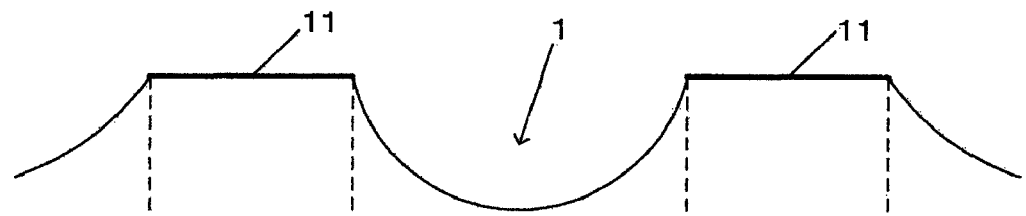
FIG. 1B
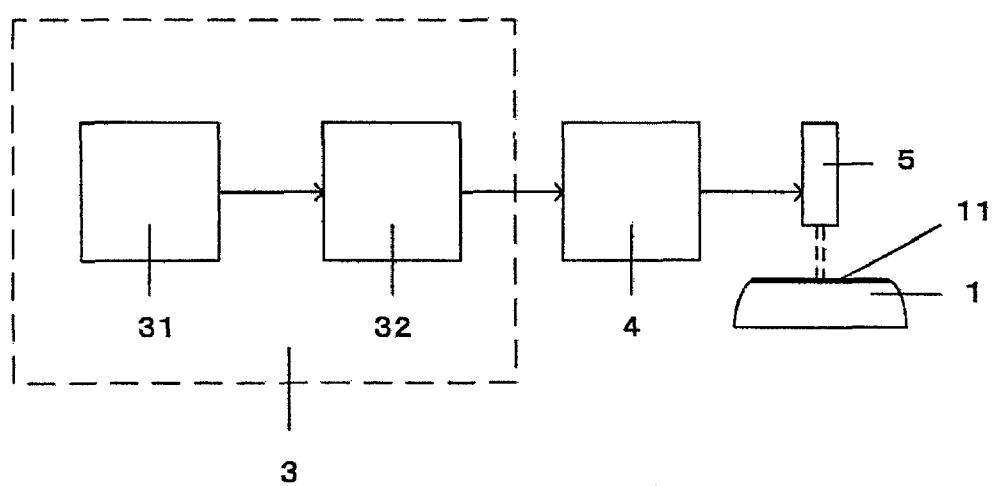
FIG. 2

OPTICAL FABRICATION METHOD

BACKGROUND OF THE INVENTION

1. Field of the Invention

The present invention relates to an optical fabrication method which performs a step of forming a powder layer of a predetermined thickness and then sintering the powder layer with a light beam, a predetermined number of times, and cuts the periphery of the powder layers.

2. Description of the Related Art

In the technical field of forming three-dimensional fabricated articles by sintering metal or non-metal powder with a light beam like a laser beam, various methods have already been proposed. Each of the methods includes:

(1) a dispersion and planarization step of dispersing powder falling down and smoothing an upper surface of the dispersed powder or near the upper surface;

(2) a step of irradiating a fabrication area with a light beam like a laser beam to sinter the irradiated area; and (3) a step of forming the periphery of a single layer or a plurality of layers subjected to the sintering step (2) while cutting the peripheral edge portion(s) thereof with an end mill, and the above steps (1), (2) and (3) are repeated to form finally necessary three-dimensional shapes.

According to the conventional techniques, as disclosed in Japanese Unexamined Patent Application Publication (Translation of PCT Application) Nos. Hei 8-502703 and 2003-502500, in the sintering step (2), the degree of irradiation in the fabrication area of an irradiation surface as shown in FIG. 1 is kept approximately constant and is not particularly adjusted in the area.

It is needless to say that while the hardness and density of an object to be fabricated naturally change according to the degree of sintering, the object to be fabricated should not necessarily be demanded of constant hardness and density over the entire area.

There are a lot of cases where while higher hardness and higher density are required at the peripheral portion of the surface of the object to be fabricated, high hardness and high density are not always required in the center portion of the surface of the object to be fabricated.

However, there may be the opposite but rare case where low hardness and low density are required at the peripheral portion of the surface of the object to be fabricated and high hardness and high density are required in the center portion of the surface of the object to be fabricated.

In this case, irradiating a light beam of about the same intensity over the entire fabrication area as done according to the conventional techniques means to perform irradiation with a wasteful light beam, and is inadequate in terms of the fabrication speed and fabrication cost.

What is more, when objects to be fabricated sintered in such a way as to provide approximately the uniform hardness and density are coupled together as individual constituting portions as done in the conventional techniques while the hardness and density are needed to be sequentially changed, rapid changes in hardness and density occur at the coupled boundary portions. This results in a lot of defects, such as separation and cracking.

Such a case brings about basic shortcomings, such as leakage of a liquid like passing water, and reduction in the required mechanical strength, in the pipe structure which needs to pass a fluid.

While Japanese Patent No. 3446733 discloses high-density sintering of the surface of a powder sintering portion, the invention disclosed therein fails to assume on sequential adjustment of the hardness and density over the entire sintering area.

SUMMARY OF THE INVENTION

Accordingly, it is an object of the present invention to provide an optical fabrication method which is capable of adjusting a hardness and a density needed for each optical fabrication area in fabricating a three-dimensional fabricated article through sintering with a light beam, and is excellent in a working efficiency. To achieve the object, fundamentally, the optical fabrication method performs the step of forming a powder layer of a predetermined thickness and then sintering the powder layer with a light beam, a predetermined number of times, cutting a periphery of the powder layers, and changing a degree of sintering by changing an amount of irradiation per unit area of a light-beam sintered surface according to a shortest distance from a peripheral surface of each powder layer.

BRIEF DESCRIPTION OF THE DRAWINGS

FIGS. 1A and 1B are respectively a side view and a plan view showing a sintering surface, both illustrating that a specific planar area becomes an object to be sintered at the time of sequentially forming objects to be fabricated;

FIG. 2 is a block diagram showing a CAD (computer aided design)/CAM (computer aided manufacturing) system;

DESCRIPTION OF REFERENCE NUMERALS

Figure 3A:
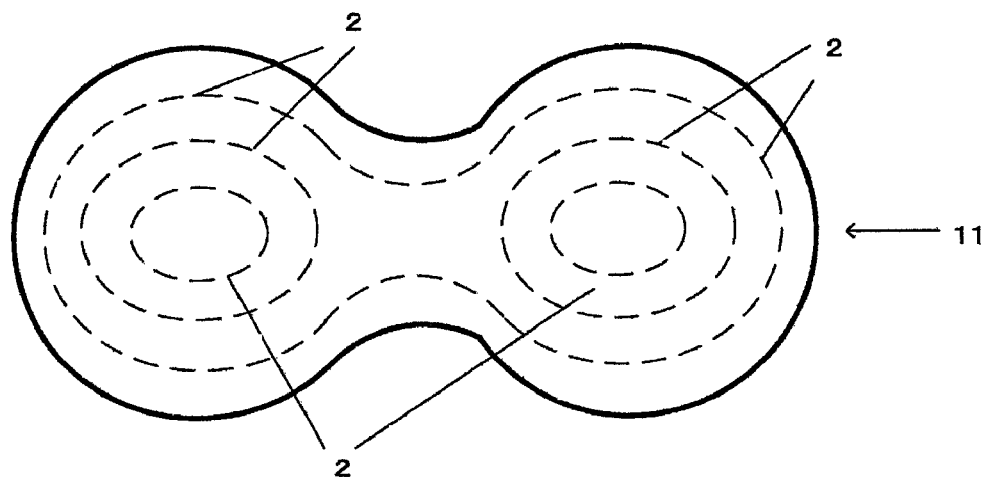
FIG. 3A is a plan view of a typical embodiment of the present invention, showing an entire planar area which is scanned with a light beam along equipotential lines.
Figure 3B:
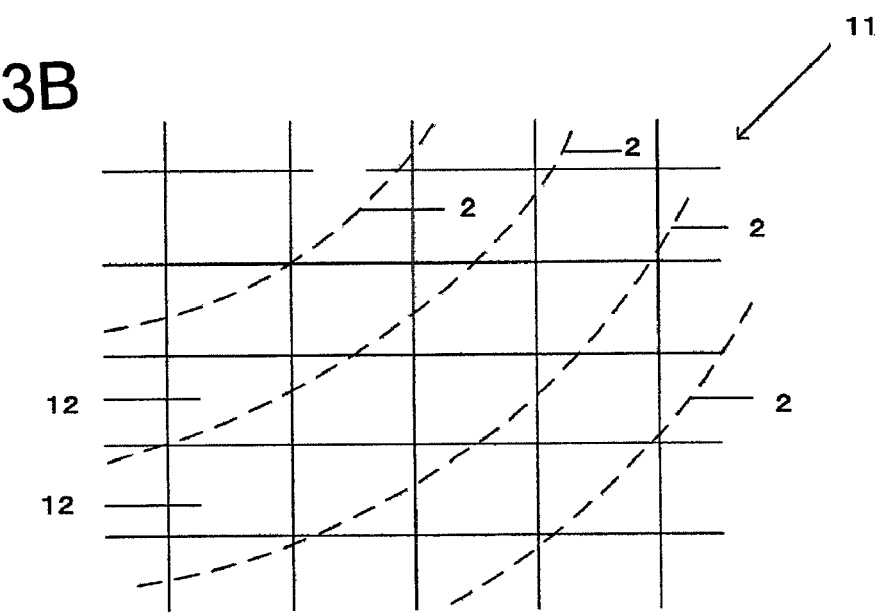
FIG. 3B is a partially enlarged plan view of the embodiment, showing adjustment of the amount of irradiation of the light beam for each irradiation unit area.

1 object to be fabricated
11 sintered surface
12 segment area
2 equipotential line
3 CAD/CAM system
31 CAD system
32 CAM system
4 NC controller
5 light beam irradiating device

DETAILED DESCRIPTION OF THE PREFERRED EMBODIMENTS

Preferred embodiments of the present invention will now be described referring to the accompanying drawings.

The reason why the degree of irradiation of a light beam is adjusted according to the shortest distance from the peripheral surface of an object to be fabricated as employed in the aforementioned fundamental structure is that in most objects to be fabricated 1, the required hardness and density differ according to the distance from the surface.

In case of most mechanical parts like molds, for example, the required hardness and density are likely to become lower toward the center of the surface as compared with those at the surface and in the vicinity thereof.

In a special field, such as a medical field which deals with material, such as artificial bones in place of a human body, however, there is an exceptional case where hardness and density required can be low in the surface and in the vicinity thereof but become higher toward the center.

Such hardness and density depend on the amount of irradiation per unit area of the surface which is sintered with a light beam. The amount of irradiation per unit area is adjusted by changing, for example, the spot size of an irradiation area or the amount of the light beam in the irradiation area, such as the light beam output power, or the scanning speed according to the shortest distance from the peripheral surface.

To work out the invention, it is essential to change the amount of irradiation per unit area according to the shortest distance while actually scanning the area with a light beam.

In the actual optical fabrication process, the powder dispersion and planarization step (1), the sintering step (2) and the forming step (3) are realized by a CAD/CAM system 3 as shown in FIG. 2.

A CAD system 31 sets an object shape, the CAD system 31 or a CAM system 32 sets data needed for processing the object, and the CAM system 32 creates a process needed to control the steps (1), (2) and (3), after which an NC controller 4 controls the steps (1), (2) and (3).

The following are two typical embodiments of the present invention premised on the use of the CAD/CAM system 3.

(a) An optical fabrication method comprising:
setting a shape of a peripheral surface of each sintered unit with a CAD system 31;
setting a plurality of equipotential lines 2, each obtained by coupling a plurality of points of an equal shortest distance from a peripheral surface of each sintered surface 11, on each sintered surface 11, and setting irradiation unit areas by equisegmenting each sintered surface 11 of a width equal to or smaller than an irradiation width of a light beam in a vertical direction and in a horizontal direction, by using the CAD system 31 or a CAM system 32;
changing the amount of irradiation of the light beam per unit area for each equipotential line 2.

(b) An optical fabrication method comprising:
setting a shape of each sintered unit with a CAD system 31;
setting a plurality of equipotential lines 2, each obtained by coupling a plurality of points of an equal shortest distance from a peripheral surface of each sintered surface 11, on the each sintered surface 11, and setting irradiation unit areas by equisegmenting the each sintered surface 11 of a width equal to or smaller than an irradiation width of a light beam in a vertical direction and in a horizontal direction, by using the CAD system 31 or a CAM system 32;
setting an amount of irradiation of the light beam for each of the irradiation unit areas in association with the equipotential lines 2 that pass each irradiation unit area using software created by the CAM system 32; and
instructing an amount of irradiation to a light beam irradiating device 5, which scans each irradiation unit area in the vertical direction or in the horizontal direction, via an NC controller 4.

In the embodiment (a) where a light beam is moved along the equipotential lines 2, a very efficient work is achieved by adjusting at least one of the amount of irradiation and the scanning speed of the light beam for each equipotential line 2 by the CAD/CAM system 3 while keeping the amount of irradiation and the scanning speed of the light beam moving along the equipotential lines 2.

In the embodiment (a), to move the light beam from a specific equipotential line 2 to a next, adjoining equipotential line 2, the CAM system 32 needs to preset a program capable of discriminating that the light beam circles around along one equipotential line 2 once, i.e., that the light beam returns to the same position as the start position of the equipotential line 2, and instructing movement of the light beam to an adjoining equipotential line 2 based on the discrimination result via the NC controller 4.

In the embodiment (b) where each irradiation unit area is set, the amount of irradiation of a light beam is adjusted for each irradiation unit area, so that the embodiment (b) is not possible or is very hard to be adapted to a method of adjusting the scan speed of the light beam.

The method (b), however, can follow the conventional method of linearly moving a light beam.

In the embodiment (b), a single equipotential line 2 may not pass each segment area 12 depending on the relationship between the widths of the equipotential lines 2 and the widths of the segment areas 12, but there may be a case where a plurality of equipotential lines 2 pass each segment area 12.

In a case where the equipotential lines 2 pass a specific irradiation unit area, the specific irradiation unit area is further divided into segment areas for each of the equipotential lines 2 and the amount of irradiation corresponding to each of the equipotential lines 2 is set in each of the segment areas by using the software created by the CAM system 32.

In a case where the equipotential lines 2 do not pass a specific irradiation unit area, the average value of the amount of irradiation of the light beam in irradiation unit areas at closest positions in the vertical direction or in the horizontal direction and on both sides where the equipotential lines 2 pass is set, or the amount of irradiation which is sequentially changed from the amount of irradiation of the light beam in an arithmetical manner or a geometrical manner is set, for each irradiation unit area by using the software created by the CAM system 32.

An example will be described below.

If a program relating to control is created at the time of fabricating a next object after fabrication of a specific object is completed using the CAD/CAM system 3, control using the NC controller 4 cannot be executed based on the program during the program creating time.

In the example which is premised on the use of the CAD/CAM system 3, the CAM system 32 creates a program relating to control of an object to be fabricated 1 to be fabricated next while instructing the degree of irradiation of a light beam for a specific object to be fabricated 1.

The use of the structure of the example can substantially make the time required to create the program in the CAM system 32 to 0, thus realizing a very efficient continuous work.

With the above-described fundamental structure, the invention can achieve sintering necessary for the desired hardness and density for each fabrication area with the shortest distance from the peripheral surface being a reference, and improving the fabrication speed and fabrication cost as compared with a case of effecting about the same degree of sintering over the entire area.

The invention can be applied to all the fields of optical fabrication by sintering a powder layer with a light beam.

What is claimed is:

1. An optical fabrication method comprising the steps of:
forming a powder layer of a predetermined thickness and then sintering the powder layer with a light beam, a predetermined number of times;
cutting a periphery of the powder layer; and
changing a degree of sintering by changing an amount of irradiation per unit area of a light-beam sintered surface according to a parameter of a shortest distance from a point A of a peripheral surface of the powder layer to be cut thereof with an end mill to a point B of a sintering position wherein the density of an amount of irradiation per unit area becomes lower or higher toward the center of the surface.

2. The optical fabrication method according to claim 1, wherein the degree of sintering is changed by changing an amount of the light beam in an irradiation area according to the shortest distance from the peripheral surface.

3. The optical fabrication method according to claim 1, wherein the degree of sintering is changed by changing a scan speed of the light beam in an irradiation area according to the shortest distance from the peripheral surface.

4. An optical fabrication method comprising the steps of:
setting a shape of a peripheral surface of a sintered unit with a computer aided design (CAD) system;
setting a plurality of equipotential lines, each obtained by coupling a plurality of points of an equal shortest distance from a point A of the peripheral surface of the powder layer to be cut thereof with an end mill to a point B of a sintering position in the powder layer at pitches equal to or smaller than a spot width in an irradiation area of a light beam surface, and scanning the sintered surface along the equipotential lines with the light beam with an approximately equal amount of irradiation per unit area, by using one of:
the computer aided design (CAD) system and
a computer aided manufacturing (CAM) system; and
changing the amount of irradiation of the light beam per unit area for each equipotential line wherein the density of an amount of irradiation per unit area becomes lower or higher toward the center of the surface.

5. The optical fabrication method according to claim 4, wherein the computer aided manufacturing (CAM) system instructs a degree of irradiation of the light beam for a specific object to be fabricated, whereas it creates a program associated with control for a fabrication object to be fabricated.

6. An optical fabrication method comprising the steps of:
setting a shape of a sintered unit with a computer aided design (CAD) system;
setting a plurality of equipotential lines, each obtained by coupling a plurality of points of an equal shortest distance from a point A of a peripheral surface of the powder layer to be cut thereof with an end mill to a point B of a sintering position in the powder layer, and setting irradiation unit areas by equisegmenting the sintered surface of a width equal to or smaller than an irradiation width of a light beam in a vertical direction and in a horizontal direction wherein the density of an amount of irradiation per unit area becomes lower or higher toward the center of the surface, by using one of:
the computer aided design (CAD) system and
a computer aided manufacturing (CAM) system;
setting an amount of irradiation of the light beam for each of the irradiation unit areas in association with the equipotential lines that pass each irradiation unit area using software created by the CAM system; and
instructing an amount of irradiation to a light beam irradiating device, which scans each irradiation unit area in the vertical direction or in the horizontal direction, via an NC controller.

7. An optical fabrication method comprising the steps of:
setting a shape of a sintered unit with a computer aided design (CAD) system;
setting a plurality of equipotential lines, each obtained by coupling a plurality of points of an equal shortest distance from a point A of a peripheral surface to a point B of a sintering position to be cut thereof with an end mill in a sintered surface, on the sintered surface, and setting irradiation unit areas by equisegmenting the sintered surface of a width equal to or smaller than an irradiation width of a light beam in a vertical direction and in a horizontal direction, by using one of:
the computer aided design (CAD) system and
a computer aided manufacturing (CAM) system;
setting an amount of irradiation of the light beam for each of the irradiation unit areas in association with the equipotential lines that pass each irradiation unit area using software created by the CAM system; and
instructing an amount of irradiation to a light beam irradiating device, which scans each irradiation unit area in the vertical direction or in the horizontal direction, via an NC controller,
wherein when the equipotential lines pass a specific irradiation unit area, the specific irradiation unit area is further divided into segment areas for each of the equipotential lines and the amount of irradiation corresponding to each of the equipotential lines is set in each of the segment areas by using software created by the CAM system.

8. An optical fabrication method comprising the steps of:
setting a shape of a sintered unit with a computer aided design (CAD) system;
setting a plurality of equipotential lines, each obtained by coupling a plurality of points of an equal shortest distance from a point A of a peripheral surface to a point B of a sintering position to be cut thereof with an end mill in a sintered surface, on the sintered surface, and setting irradiation unit areas by equisegmenting the sintered surface of a width equal to or smaller than an irradiation width of a light beam in a vertical direction and in a horizontal direction, by using one of:
the computer aided design (CAD) system and
a computer aided manufacturing (CAM) system;
setting an amount of irradiation of the light beam for each of the irradiation unit areas in association with the equipotential lines that pass each irradiation unit area using software created by the CAM system; and
instructing an amount of irradiation to a light beam irradiating device, which scans each irradiation unit area in the vertical direction or in the horizontal direction, via an NC controller,
wherein when the equipotential lines do not pass a specific irradiation unit area, one of:
an average value of the amount of irradiation of the light beam in irradiation unit areas at closest positions in the vertical direction or in the horizontal direction and on both sides where the equipotential lines pass is set, and
an amount of irradiation which is sequentially changed from the amount of irradiation of the light beam in an arithmetical manner or a geometrical manner,
is used for each irradiation unit area by using software created by the CAM system.

* * * * *